March 19, 1963 L. F. EASTMAN 3,081,618
VACUUM TUBE TESTING DEVICE
Filed March 9, 1959

INVENTOR.
Lester F. Eastman
BY
Ezekiel Wolf, Wm. Greenfield
ATTORNEYS

United States Patent Office 3,081,618
Patented Mar. 19, 1963

3,081,618
VACUUM TUBE TESTING DEVICE
Lester F. Eastman, 8 Library St., Dryden, N.Y.
Filed Mar. 9, 1959, Ser. No. 798,160
2 Claims. (Cl. 73—15)

This invention relates to vacuum tubes and more particularly comprises a new device for analyzing the thermal effectiveness of vacuum tube cooling techniques.

It is well known that the over heating of vacuum tubes shortens tube life and impairs their reliability. Nevertheless, heretofore no test equipment has been available to duplicate the thermal conditions which exist in an operating vacuum tube and measure the temperatures of various components of the tubes. Many tube manufacturers have suggested that the bulb temperature of a vacuum tube is a reliable index of the thermal condition of a tube and have charted what they consider to be safe tube temperature limits in terms of bulb temperature. However, tests have revealed that bulb temperature is not always a reliable index of the thermal conditions and other information is needed to determine the effectiveness of the various cooling techniques employed.

Most of the heat dissipated in an electron tube appears at the plate. Not only is the plate heated by its normal dissipated energy, but much of the heat originating at the filament, cathode, control grid, and screen grid is transmitted by radiation through the vacuum into the plate. In general, only a small portion of the total heat dissipated in a tube is conducted through the leads. Cathode temperature is influenced by plate temperature, because the plate essentially surrounds the cathode and the cathode reaches thermal equilibrium by radiation to the plate as a function of the fourth power of the absolute plate temperature. In a like fashion, the temperatures of the other tube elements are affected by plate temperature. Thus, most of the dissipated thermal energy ultimately arrives at the plate. This can be demonstrated by monitoring the plate temperature of a tube with only the heater being energized.

At constant power dissipation, it has been observed in many instances that those cooling techniques which reduce plate temperatures lead to higher bulb temperatures and vice versa. It has been found that this effect was due to the transmittance characteristics of the glass bulbs with respect to the wave length of the radiation spectra from the plates. It is possible for a well cooled tube to exhibit a higher bulb temperature than a poorly cooled tube of the same type at the same power dissipation.

Bulb temperature is still considered to be an important thermal parameter even though it is an indirect result rather than a good measure of the true thermal condition of a tube. It should, however, be viewed in its proper light. The temperature of the envelope or bulb is of secondary importance but it is necessary to make sure that it is not the weakest link in the "reliability chain."

The primary object of this invention is to provide means for thermally evaluating the operation of several components comprising a vacuum tube.

Another important object of this invention is to provide a testing device which duplicates the operating thermal characteristics of a vacuum tube and which may be mounted in a chassis as a substitute for the tube being duplicated. In this manner, the measurements obtained from the device are identical to those which actually exist in the equivalent vacuum tube when the electronic equipment is operational.

These and other objects of the invention are accomplished by a testing device which is substantially the complete therrmal analogy of the vaccum tube to be analyzed. Physically, the test device is a thermal diode, and its external appearance is identical to the vacuum tube to be analyzed, being the same size as the equivalent vacuum tube and having a glass bulb or envelope identical to the tube. The evacuated bulb houses a tungsten helix which serves as a heating element. The axis of the element is aligned with the axis of the envelope and is surrounded by a cylindrical plate substantially identical to the anode in the original tube. Mica support wafers carry the plate and the heating element and are also identical to those found in the tube being simulated thermally.

A hollow ceramic cylinder is disposed inside the helical heating element to support it at high temperatures. This support for the heating element is particularly important when the testing device is positioned horizontally for in its absence, the element could sag against the anode or plate and cause instrument failure.

Two thermocouples are disposed within the envelope. One of the thermocouples is secured to the cylindrical plate and the other is secured to the inner surface of the bulb preferably adjacent the thermocouple on the plate. A solder glass having a lower melting point than the glass envelope is used to secure the thermocouple to the bulb. This must be done without reducing the vacuum within the bulb.

The pin arrangement extending from the base of the tube is identical to that of the tube being simulated and these pins provide electrcial connections to the heating element, thermocouples, and the anode or plate. The device is designed to dissipate the same wattage as the tube being analyzed. The heat generated by the tungsten heating element radiates outwardly to the plate or anode and the heat directed to the plate is transmitted outwardly from it in the same manner as the heat directed to the anode in the conventional tube.

These and other objects and features of this invention, along with its incident advantages, will be better understood and appreciated from the following detailed description, read with reference to the accompanying drawings, in which.

It has been suggested in the introduction that at constant power dissipation, many cooling techniques used to reduce plate temperature lead to higher bulb temperature. Similarly, techniques used to reduce bulb temperature often cause an increase in the plate temperature of a tube. Investigations revealed that this effect was due to the transmittance characteristics of the glass bulbs with respect to the wave length of the radiation spectra from the plates. Plate temperatures in receiving type tubes range from 350° C. to as high as 600° C. Almost all of the energy dissipated by a plate is transmitted to the vacuum by radiation and is transmitted through or absorbed by the glass bulb dependent upon the configurations, emissivities, relative temperatures and the transmittance of the particular glass involved. The transmissivity of most electron tube glasses begins to drop off for infrared radiation longer than 2.5 microns.

Figure 3:
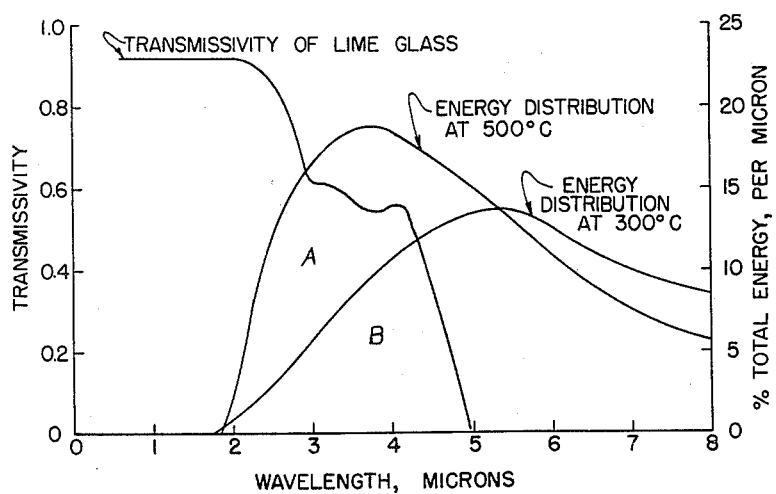
FIGURE 3 is a graph showing the relationship of the transmittance of glass and the energy distribution for several plate temperatures.

The relationship of the transmittance of glass and the energy distribution for several plate temperatures are presented in FIGURE 3. It will be noted that the energy in areas A and B is transmitted directly through the glass when a plate is at 500° C. Conversely, only the energy in area B is transmitted through the glass when a plate is at 300° C. Consequently, as the elements of a tube are reduced in temperature, the relative proportion of the total dissipated energy absorbed by the glass bulb will increase. In other words, when the plate is at a lower temperature, less radiant energy is transmitted through the glass and more radiant energy is absorbed by the glass. Thus, it is possible for a well cooled tube to exhibit a higher bulb temperature than a poorly cooled tube of the same type at the same power dissipation. For this reason, the thermal effectiveness of receiving tube cooling techniques cannot be measured solely by the investigation of bulb temperature alone. This testing device provides means for monitoring bulb temperature and plate temperature to determine the effectiveness of tube cooling techniques.

The testing device includes a glass envelope 10 which is identical to the envelope of the equivalent vacuum tube. Disposed within the evacuated bulb or envelope 10 is a cylindrical plate 12 and a helical heating element 14, each coaxial with the envelope axis. The plate 12 preferably is identical to the plate or anode found in the equivalent vacuum tube and is carried on mica support wafers 16 and 18 as in the vacuum tube equivalent. Thus, the test device is a thermal diode equivalent of the vacuum tube to be analyzed.

The helical heating element 14 is made of a tungsten filament of rather small diameter. The actual diameter of the wire will vary with the particular type of vacuum tube being thermally simulated. In the actual construction of the thermal equivalent of a 6AQ5 vacuum tube, the heating element was made of a tungsten filament .0045 inch in diameter. The helix in this testing device has a diameter approximately twice that of the cathode in the 6AQ5 tube.

With prolonged use, the tungsten helix has been found to soften due to the necessarily high operating temperature. This is particularly troublesome when the testing device is oriented in a horizontal position for the helix when softened may sag against the plate and cause failure. To overcome this difficulty, a ceramic cylinder 20 is disposed inside the helical heating element to support it. The cylinder 20 may be carried by pins 21 anchored in the mica supports 16 and 18 in a manner similar to the plate support. The ceramic cylinder disposed in this position prevents the heating element from sagging against the plate and will support the element in the position illustrated regardless of the position in which the testing device is mounted.

An iron-constantan thermocouple 22 is welded to the outer surface of the plate 12 and a second iron-constantan thermocouple 24 is secured to the inner surface of the bulb 10 opposite the thermocouple 22. The thermocouple 22 may be secured to the envelope 10 by any material compatible with the proper operation of the device. It is of course necessary that the thermocouple 24 be secured to the bulb 10 in a manner that does not reduce the vacuum (increase the pressure) of the tube. To prevent such an occurrence, a solder glass identified as Corning No. 7570 manufactured by Corning Glass Company mixed in Amyl Acetate is used to fuse the thermocouple to the bulb. The solder glass melts at 450–500° C. while the glass used in most electron tubes softens at approximately 150° higher, and it is thus possible to fuse the thermocouple to the bulb without softening it. In practice, the envelope may be laid horizontally in a temperature controlled oven with the thermocouple disposed inside the bulb on its lower surface. A drop of the solder glass mixture may then be deposited on the thermocouple and bulb. Thereafter, the oven temperature may be gradually increased over approximately a one-half hour period to 475° C. and maintained at that temperature for approximately fifteen minutes. Following the baking period, the oven may be gradually lowered to 50° C. over the course of one hour. When this practice is followed, the solder glass mixture will melt and during the cooling period fuse the thermocouple to the bulb. This type of connection provides a good heat conductive path between the bulb and the thermocouple.

Figure 1:
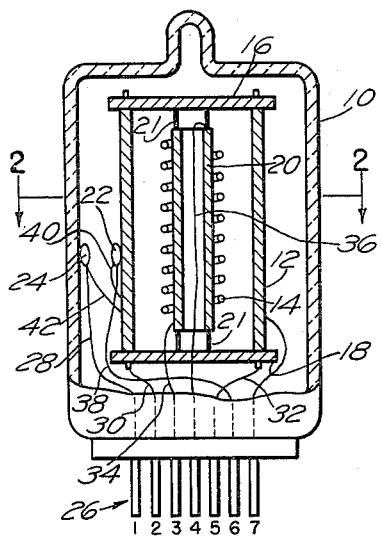
FIGURE 1 is an elevation view of one embodiment of a vacuum tube testing device constructed in accordance with this invention.
Figure 2:
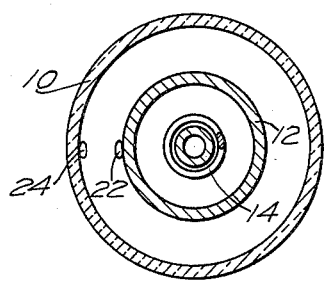
FIGURE 2 is a cross sectional view taken along the corresponding section line of FIGURE 1.

The testing device shown in FIGURES 1 and 2 is the thermal equivalent of the 6AQ5 vacuum tube and therefore has the same number of pins as that tube, namely, seven pins identified collectively by numeral 26. FIGURE 1 illustrates the manner in which the various components in the tube are connected to the pins 26.

The iron wire 28 of the thermocouple 24 is connected to pin 1. The electrical connections to the anode or plate 12 are made through pins 2 and 5 as suggested by the leads 30 and 32. One lead 34 of the heating element 14 is connected between the bottom of the helix and the pin 3 while the lead 36 extends downwardly from the top of the helix through the ceramic cylinder 20 and is connected at its lower end to the pin 4. The iron wire 38 of the thermocouple 22 is connected to the pin 6 while the constantan wires 40 and 42 of the thermocouples 22 and 24 are joined together and connected to the pin 7. Thus, the pins 2 and 5 provide means for connecting the plate 12 to a thermal reference, the pins 3 and 4 provide means for applying a potential to the heating element 14, and the other pins provide a ready means for connecting the thermocouples to measuring instruments.

Because the testing device is the same size as its vacuum tube equivalent and has the same number of pins, it may readily be mounted in the tube socket on a chassis in place of the tube to be analyzed. In use, it is only necessary that the socket connections be modified to furnish the desired potential to the heating element 14 and provide connections to instruments to measure the temperatures sensed by the thermocouples to conduct the tests desired. To provide adjustment and cause the testing device to operate at precisely the same power level as the vacuum tube which it replaces for testing purposes, pins 3 and 4 should be connected to a power source through a potentiometer (not shown). The socket connections which receive pins 1 and 6 should be connected to galvanometers calibrated for the thermocouples to give a temperature reading equivalent to the current generated by the thermocouples. Obviously, other forms of temperature indicating devices may be used with the thermocouples for this purpose.

In producing the thermal equivalents of certain types of tubes, the heating element 14 may be found to radiate excessive amounts of heat through the mica supports 16 and 18 to the ends of the bulb. When this occurs, reflecting metal discs made of nickel or some other similar material may be placed at the ends of the heater on the opposed faces of the mica discs 16 and 18. These metal discs will serve as heat shields and direct the radiant heat to the plate 12 so as to preserve the thermal analogy. The reflecting discs not only will serve to avoid the excessive bulb end temperatures due to the mica conduction, but in addition, may reduce bulb and thermal stresses which could otherwise cause glass breakage.

Tests have revealed that the energy normally dissipated by the elements of a vacuum tube can be introduced into the heating element 14 of the testing device without significantly changing the modes of heat transfer within the tube. As a result, the thermal energy applied to the plate is substantially identical to that applied to the anode of the equivalent tube type. Therefore, the temperature of the plate 12 and the bulb 10 are in fact those encountered by the equivalent tube type when placed in operation.

From the foregoing description, those skilled in the art will apprecitate that this testing device has several advantages and a wide range of applications. The device is a reliable and accurate tool for simulating a vacuum tube. It exhibits essentially identical plate and envelope temperatures and has the same temperature distribution as its equivalent tube type. Because the testing device has a low applied voltage, and no bias, plate or screen connections, it is much easier to handle than the equivalent tube type itself. Therefore, the device has many advantages over an instrumented tube. That is, the device performs much more satisfactorily than the equivalent tube type itself when instrumented with various thermocouples in the manner of the testing device. The testing device provides an index of the thermal condition of a vacuum tube regardless of the cooling means employed and may be used to study all types of cooling techniques as well as the thermal operating characteristics of the equivalent tube type.

Because numerous modifications may be made of this invention without departing from its spirit, there is no intent to limit the breadth of the invention to the specific embodiment illustrated and described. Obviously, as tube types vary, their thermal equivalents will vary as well. Nevertheless, the concepts employed to produce the thermal equivalent are the same. As a result, it is intended that the scope of the invention be determined by the appended claims and their equivalents.

I claim:

1. A device for thermally evaluating the operation of a vacuum tube comprising a base, a glass bulb secured to the base and defining with it an evacuated closed chamber, a plate mounted in the chamber, a heater disposed within the chamber adjacent the plate capable of dissipating wattage equal to the total wattage dissipated by all of the parts of the vacuum tube type being evaluated, a support for the heater preventing it from contacting the plate, an array of conducting pins secured to the base in the arrangement of the pins of the vacuum tube type being evaluated, a pair of thermoelements disposed in the chamber and thermally connected to the plate and the inside of the glass bulb, and separate conductors providing electrical connections from the thermoelements and heater to the pins.

2. A device as defined in claim 1 wherein the plate is cylindrical, the heater is helical in shape and disposed coaxially within the plate and the thermoelements are thermocouples.

References Cited in the file of this patent

UNITED STATES PATENTS

| | | |
|---|---|---|
| 1,762,859 | Gebhard | June 10, 1930 |
| 2,765,416 | Beese et al. | Oct. 2, 1956 |

OTHER REFERENCES

Article, "Elimination of Cold-Junction Error in Thermocouple Measurements in Electron Tubes," by Solet in The Review of Scientific Instruments, vol. 29, No. 1, pp. 73–74, January 1958. Copy in 324/20 Div. 48.